(12) United States Patent
Nilson (10) Patent No.: US 7,218,021 B2
(45) Date of Patent: May 15, 2007

(54) INDUCTION MOTOR WITH INTEGRATED SENSOR

(75) Inventor: Thord Agne Gustaf Nilson, Tyresö (SE)

(73) Assignee: Danaher Motion Stockholm AB, Stockholm (SE)

( * ) Notice: Subject to any disclaimer, the term of this patent is extended or adjusted under 35 U.S.C. 154(b) by 0 days.

(21) Appl. No.: 11/168,817

(22) Filed: Jun. 28, 2005

(65) Prior Publication Data

US 2006/0006748 A1 Jan. 12, 2006

(30) Foreign Application Priority Data

Jul. 9, 2004 (SE) .................................... 0401838

(51) Int. Cl.
*H02K 11/00* (2006.01)

(52) U.S. Cl. ..................... 310/68 B; 310/179; 310/184

(58) Field of Classification Search ............. 310/68 B, 310/159, 166, 169, 179, 184, 259, 261
See application file for complete search history.

(56) References Cited

U.S. PATENT DOCUMENTS

| | | | | |
|---|---|---|---|---|
| 5,796,194 A * | 8/1998 | Archer et al. | ............. | 310/68 B |
| 6,504,275 B2 * | 1/2003 | Nondahl et al. | .......... | 310/68 B |
| 6,603,226 B1 * | 8/2003 | Liang et al. | ............. | 310/68 B |
| 2002/0135254 A1 * | 9/2002 | Peachee et al. | ............. | 310/166 |
| 2006/0197393 A1 * | 9/2006 | Labriola, II | ............... | 310/68 B |

* cited by examiner

*Primary Examiner*—Thanh Lam
(74) *Attorney, Agent, or Firm*—Holland & Hart LLP (57) ABSTRACT

An induction motor comprises a stator (10) and a rotor (20), which includes material essentially blocking magnetic flux at high frequencies. A difference in number of stator slots and rotor slots is chosen so that the inductance of a winding provided in a stator slot is different from the inductance of a winding provided in another stator slot. A sense means, such as stator winding or separate sense winding, is provided in at least one of the stator slots and the sense means is arranged to allow measuring of the inductance thereof. The sense means constitutes an integrated sensor, which is both inexpensive and reliable. A method of sensing the rotor position and/or speed of an induction motor is also described.

10 Claims, 8 Drawing Sheets

INDUCTION MOTOR WITH INTEGRATED SENSOR

The present application claims priority under 35 U.S.C. § 119 to Swedish patent application number 0401838-8, filed Jul. 9, 2004.

FIELD OF INVENTION

The present invention generally relates to an electrically controlled induction motor where a speed and/or position feedback signal is needed to accurately control the speed and/or position and more specifically to an induction motor with integrated sensor. The invention also relates to a method of sensing the speed and/or position of a rotor in an induction motor.

BACKGROUND

A speed/position sensor is often needed for controlling an induction motor by a controller (drive), especially at close to zero speed. This is conventionally accomplished by attaching an external sensor to the motor shaft. However, the use of an external sensor is accompanied with drawbacks. Firstly, an external sensor is expensive because of the very accurate mechanical and electronic components included therein. Secondly, because an external sensor by its very nature is mounted externally, it is prone to damage and also requires installation. Thus, when accuracy demands on a sensor are low to moderate and cost and reliability demands are high, a low cost integrated sensor would be preferred.

A sensor suitable for zero and near zero speed operation should give at least two signals with a suitable phase difference (e.g. 90°) so that both speed and direction of the rotor are detectable and/or a position change is detectable at all rotor positions. These signals are further fed to the control part of the controller where they influence the voltage and/or current output signals of the controller in order to maintain commanded speed and/or rotational angle of the rotor.

Most development of prior art sensors has been aimed at modifying the motor so the d- and q-inductances differ. The rotor position can then be determined by measuring these inductances in the controller and the rotor angle determined. For example U.S. Pat. No. 6,515,395 discloses several designs of an induction motor rotor to accomplish this. However, the described solution requires specially punched laminations increasing manufacturing costs, and standard manufacturing methods are not applicable for all cases.

The German patent DE10031637 discloses a method of extracting a speed signal from a similar motor. However, the solution disclosed in this document utilizes three current sensing devices. The disclosed solution will not work at near zero speed and will not detect the direction of rotation. Further, the design of the motor is not disclosed.

SUMMARY OF THE INVENTION

An object of the present invention is to provide an induction motor with an inexpensive and reliable integrated sensor for sensing the position and/or speed of the motor.

The invention is based on the observation that the inductance seen at relatively high frequencies is depending on the relative position of the nearest rotor slots as seen from a wire provided in a stator slot.

According to the invention there is provided an induction motor of the kind mentioned in the introduction which is characterized by the features of the characterizing portion of appended claim 1.

There is also provided a method of sensing the position and/or speed of an induction motor as defined in appended claim 11.

Further preferred embodiments are defined by the dependent claims.

Thus there is provided an induction motor with integrated sensor which is both inexpensive and reliable. Because no or only small modifications of a conventional stator are required, standard low cost stators can be used. There is only a minor modification from a standard rotor, if any. The central Y-tap of Y-connected stator windings is easily made available, making the required sensing of winding inductances feasible.

BRIEF DESCRIPTION OF DRAWINGS

The invention is now described, by way of example, with reference to the accompanying drawings, in which.

DETAILED DESCRIPTION OF THE INVENTION

In the following a detailed description of preferred embodiments of the present invention will be given.

Note that unless otherwise stated the following description will describe the motor properties at a frequency that is suitable for the sensor signal, such as 1–10 kHz, and not the normal operating frequency of the motor, such as between 0 and 500 Hz.

In this description, in some instances reference is made to stator and rotor laminations and slots therein while in other instances reference is made to stators and rotors and slots therein. It will be appreciated that the inventive idea is applicable to entire induction motors comprising stator and rotor made up of stacks of laminations and that the varying references are for ease of understanding only.

Figure 1:
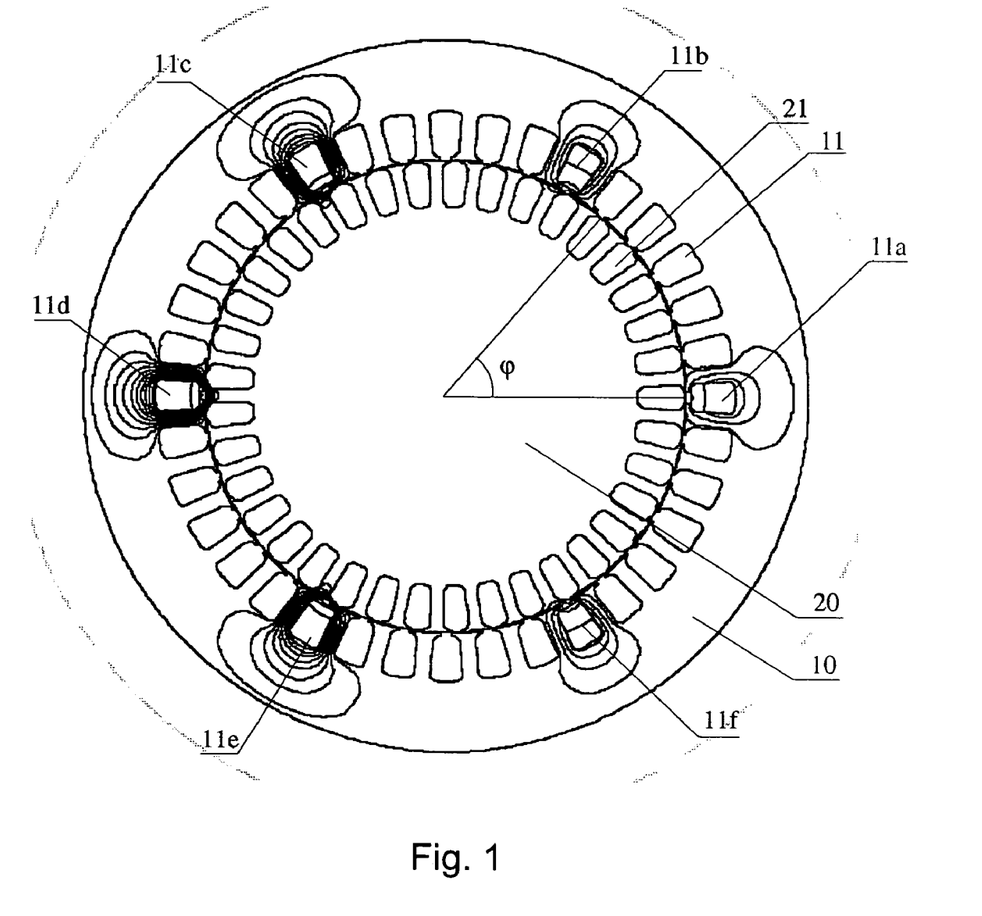
FIG. 1 shows a finite element simulation of a cross-sectional view of an induction motor rotor and stator.

FIG. 1 shows a finite element simulation of the magnetic flux created in induction motor stator and rotor laminations. A stator lamination 10 is provided with 36 identical slots 11 evenly distributed around the inner portion of the stator lamination. These slots are adapted for receiving conductors making up the motor windings as is conventional. Correspondingly, a rotor lamination 20 is provided with 37 evenly distributed slots 21, each filled with aluminum forming the rotor winding.

To show the basic principles of the invention, each of the stator slots 11a–f has a conductor carrying identical AC currents with a relatively high frequency of 10 kHz, for example. These AC currents create a magnetic flux around the conductors as is shown for the stator slots 11a–f in the figure. If the frequency is high enough then eddy currents in the rotor winding make the rotor slots act as barriers for the magnetic flux from the stator slots, i.e., the aluminum in the rotor slots present a high magnetic resistance to the magnetic flux created by the stator current. This also means that the magnetic coupling between the slots will be low, so the winding inductance can be considered to be the sum of the different slot-inductances and a leakage inductance.

In FIG. 1, because the rotor lamination 20 has one slot more than the stator lamination 10, the relative positions of the rotor and stator slots will vary around the circumference of the rotor for a given rotor position. For example, with the rotor position shown in FIG. 1 stator slot 11a faces a rotor slot while the opposite stator slot 11d is positioned directly between two rotor slots. This difference creates a variation of the inductance for a wire in the stator slots 11a–f that can be inferred by the difference in magnetic flux lines around each of said stator slots. Thus, the flux around stator slot 11a faces a high magnetic resistance resulting in a low flux while the flux around stator slot 11d faces a low magnetic resistance resulting in a high flux.

For simplification, let us assume this variation is sinusoidal with respect to the angle from the center of the rotor to slot 11a.

The following assumes that the opening of slot 11a is aligned with the opening of the nearest rotor slot as shown in FIG. 1:

$$L_{slot}=Lo-Ld*\cos(N_{difference}*\alpha)$$

Where:

$L_{slot}$=slot total inductance
Lo=slot initial inductance
Ld=slot differential inductance
$N_{difference}$=difference in number of slots between rotor and stator
φ=slot angle from slot 11a, i.e., slot 11b is at 60°, slot 11c is at 120° etc.

If the rotor is allowed to rotate the following result is obtained with the configuration shown in FIG. 1:

$$L_{slot}=Lo-Ld*\cos(N_{difference}*\phi+N_{rotor}*\alpha)$$

Where:

$N_{rotor}$=number of rotor slots
α=mechanical rotor angle from the position shown in FIG. 1

The inductance of a wire is determined by the following formulas:

$$\Psi = Li$$

$$e = L\frac{di}{dt}$$

where Ψ is the magnetic flux, L is the conductor inductance, i is the conductor current, and e is the winding voltage. This means that if the inductance of a wire in a stator slot varies with the position of the rotor, then the position of the rotor can be determined if the inductance is determined.

The basic principles of the magnetic flux in an induction motor have now been explained. The invention will now be described by example, initially with reference to an induction motor configuration shown in FIG. 2. The described motor is a 4-pole three-phase induction motor provided with 36 stator slots evenly distributed around the stator. The rotor is provided with 41 rotor slots 21 evenly distributed around the periphery of the cylindrical rotor. With $N_{rotor}$=41 and $N_{stator}$=36, then $N_{difference}$=5.

Figure 2:
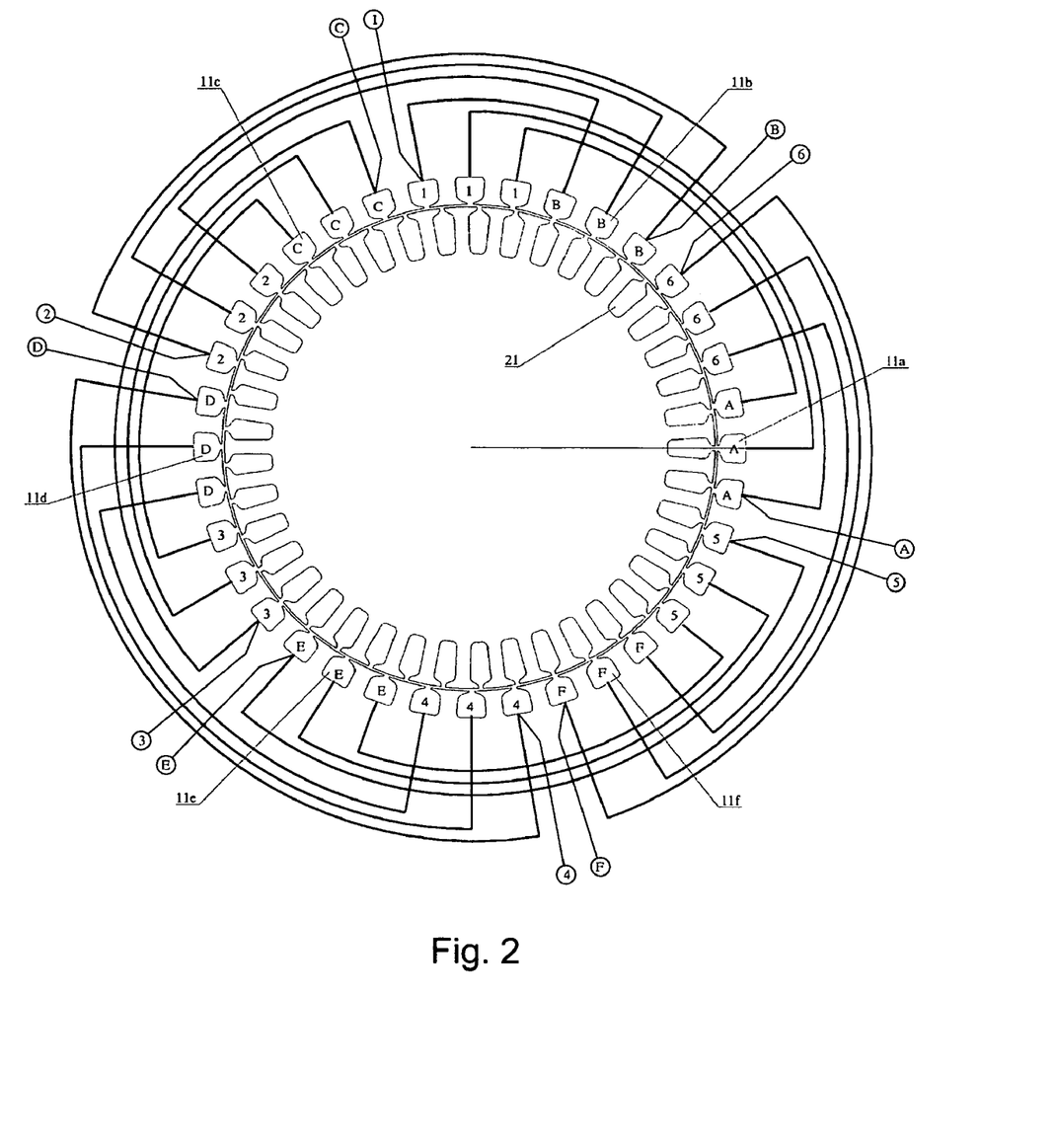
FIG. 2 shows a winding diagram for an induction motor according to the invention.
Figure 3A:
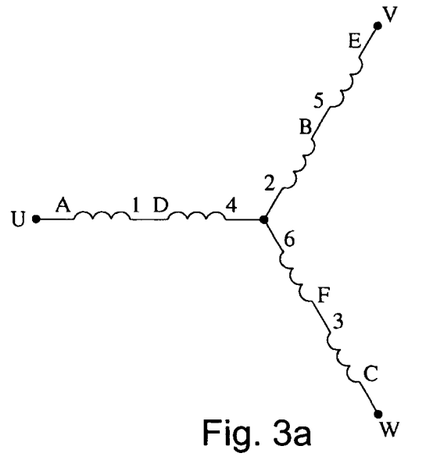
FIGS. 3a–d show some possible connections of the windings of FIG. 2.
Figure 3B:
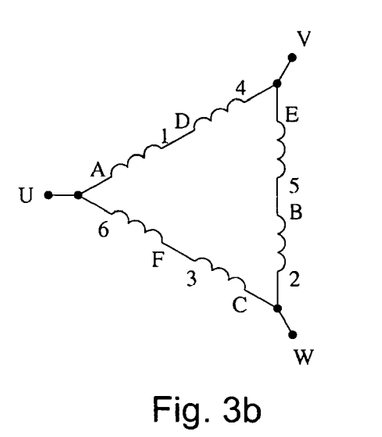
Figure 3C:
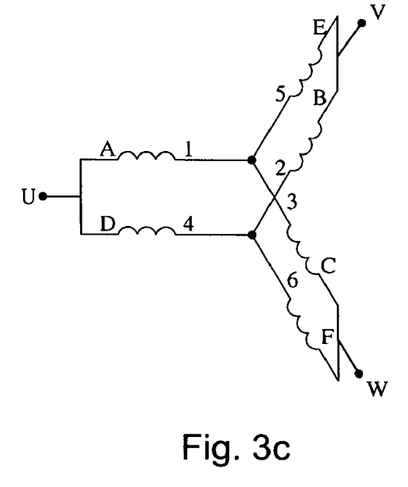
Figure 3D:
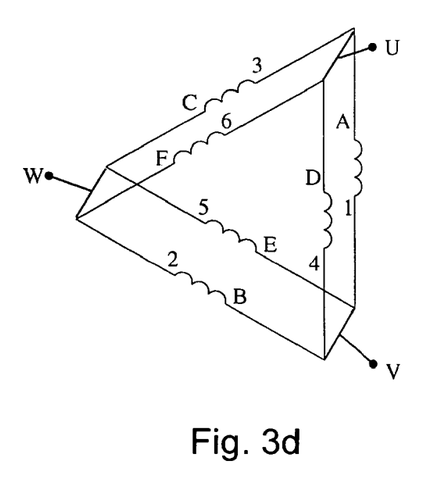

A winding diagram is shown in FIG. 2, having six windings A-1, B-2, C-3, D-4, E-5, and F-6. The corresponding stator slots are marked A, B, C, D, E, F, 1, 2, 3, 4, 5, 6. This means that the current flowing in a stator slot marked "A" is flowing in an opposite direction to the current flowing in a stator slot marked "1" and correspondingly for the other windings. The windings end in terminals denoted by circles in the figure. These terminals can be connected in various ways depending on the voltage and current requirements, for example. FIGS. 3a, 3b, 3c, and 3d show some of the possible connections of these windings.

Each winding occupies three adjacent stator slots. For simplicity, in the following description, only the central slot of the groups of three slots is considered. The effect of the slots labeled 1 to 6 are also ignored. Thus, only the stator slots labeled 11a–f in FIG. 2, corresponding to the central slot for windings labeled A–F, respectively, are considered in the following calculations.

Figure 4:
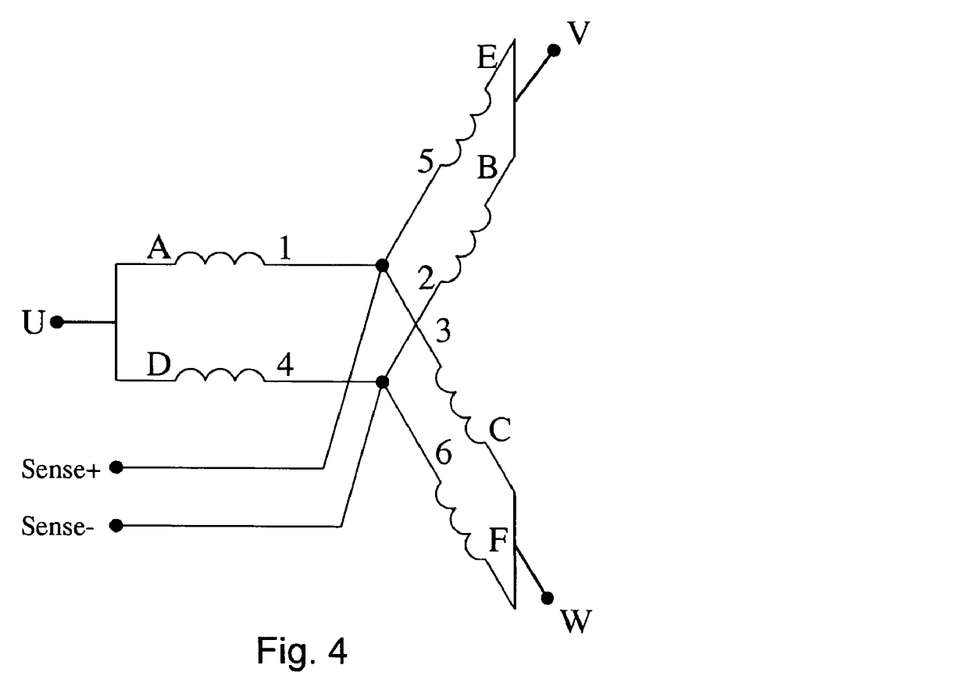
FIG. 4 shows a connection of the motor windings where the center-taps of Y connected windings are available for sensing.

Also, assume the connections shown in FIG. 4, i.e., a "Y" connection with the windings A-1 and D-4 connected in parallel. Correspondingly, the windings B-2, E-5 and C-3, F-6 are connected in parallel. The phase terminals are labeled "U", "V", and "W", respectively.

Thus, the windings A-1 and D-4 belong to the same phase but a differential measurement between them can be used in order to determine the rotor position. In a conventional motor, the center-tap of the "Y" is normally not used for any measurement. However, in the motor shown in FIG. 2 these taps labeled Sense+ and Sense− are available for measuring. This means in turn that the difference between the inductance of the winding A-1 and the inductance of the winding D-4 can be measured because their respective end points U and Sense+ and U and Sense−, respectively, are available for measuring. Various ways of measuring the winding inductances will be described below and include the sensing of voltage and/or current in the windings.

With reference to the basic idea described with reference to FIG. 1, when A-1 has minimum inductance then D-4 should be at a maximum. This will occur when the phase difference between the slot inductances are 180°:

$$L_{slotA}=Lo-Ld*\cos(N_{difference}*0+N_{rotor}*\alpha)\text{—central slot } A \text{ is at } 0°.$$

$$L_{slotD}=Lo-Ld*\cos(N_{difference}*180+N_{rotor}*\alpha)\text{—central slot } D \text{ is at } 180°.$$

From this it can be seen that $N_{difference}$ must be odd to fulfill this condition.

However, the sensing of just one pair of windings is not enough to determine the direction of rotation. To be able to sense a small change in rotor position at all possible positions a signal with a suitable phase difference is also required. For a two phase measurement system, the preferred phase difference is ±90°, for a three phase it is ±60° and ±120°. However, other phase angles can be used if they can be reliably converted with a Clarke or modified Clarke transform to a two phase system with 90° phase difference.

For this we have the other phase winding pairs B-2, E-5 and C-3, F-6, respectively.

$L_{slotB} = Lo - Ld * \cos(N_{difference} * 60 + N_{rotor} * \alpha)$—central slot B is at 60 degrees.

$L_{slotE} = Lo - Ld * \cos(N_{difference} * 240 + N_{rotor} * \alpha)$—central slot E is at 240°.

$L_{slotC} = Lo - Ld * \cos(N_{difference} * 120 + N_{rotor} * \alpha)$—central slot C is at 120°.

$L_{slotF} = Lo - Ld * \cos(N_{difference} * 300 + N_{rotor} * \alpha)$—central slot F is at 300°.

From this is can be seen that for $N_{difference}=3$, $L_{slotB}$ will be 180° displaced from $L_{slotA}$, which is the same as $L_{slotA}$ inverted. $L_{slotC}$ will be displaced 360° C. from $L_{slotA}$, which is the same as $L_{slotA}$, so no new information is obtained. Thus in this case $N_{difference}$ may not be divisible by 3.

The four lowest possible remaining values for $N_{difference}$ is then 1, 5, 7, 11. However, $N_{difference}=1$ results in excessive side forces on the rotor. Also, a too high $N_{difference}$ results in too small signals, leaving 5 and 7 as preferred choices.

Figure 5:
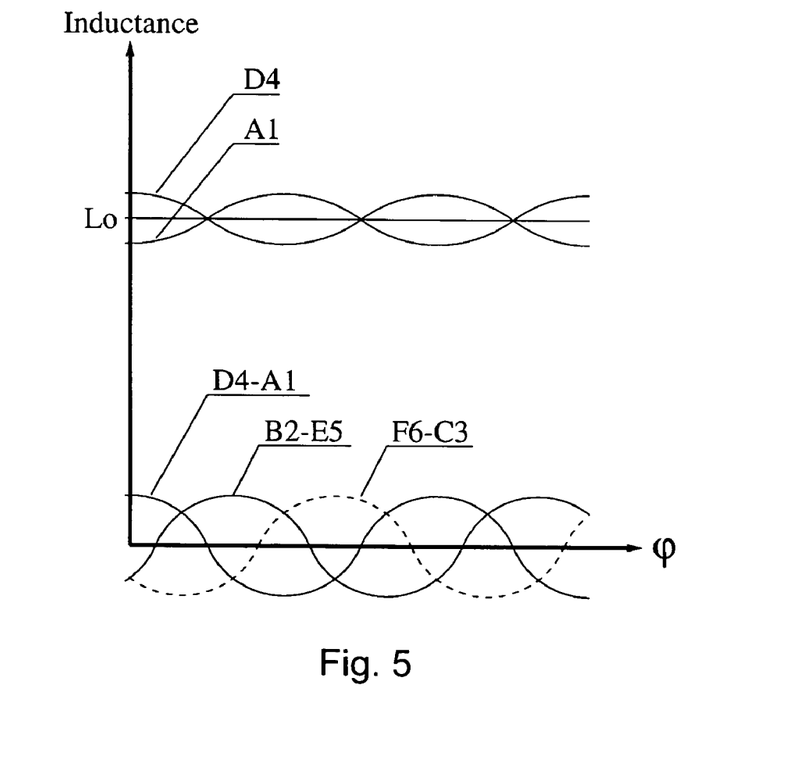
FIG. 5 is a diagram showing the high frequency inductance of some of the stator windings of the motor of FIG. 2 as a function of rotor angle.

The inductance measuring will now be described in detail with reference to FIGS. 4 and 5. If phase terminals V and W are kept at the same potential and a signal is injected into phase terminal U, the difference between Sense+ and Sense− gives an amplitude that is proportional to $$\sin(\theta + N_{rotor} * \alpha),$$

where θ is a correction for some of the simplifications made above. If the phase terminals U and W are kept at the same potential and a signal is injected into terminal V, the amplitude envelope will have a phase difference of 120°, and finally if V and U are kept at the same potential and a signal is injected into the terminal W the phase difference will be 240°.

Only two of these three signals are really needed, but the third can be used to improve symmetry and increase signal to noise ratio if desired.

The signals can be extracted either in time-multiplex-domain or frequency-multiplex-domain.

In the time-multiplex domain, the switching operations of the power stage in the controller unit driving the motor can be used as injection signal applying a voltage across the selected windings. The phases are switched in turn, while the other phases are held at constant voltage. After each switching operation the resulting signals at the sense terminals Sense+ and Sense− are analyzed.

In the frequency-multiplex domain, a drive unit is controlled to inject different frequencies in at least two of the three phase connections. A drive system adapted for sensing in the frequency-multiplex domain is shown FIG. 6. This system comprises a conventional motor control system 110 comprising among other things a digital signal processor (DSP) and associated circuitry, such as memories etc. Software code is stored in memory to execute control programs. To provide an efficient motor control, signals representing DC voltage and motor currents are input to the drive unit, as is conventional.

Figure 6:
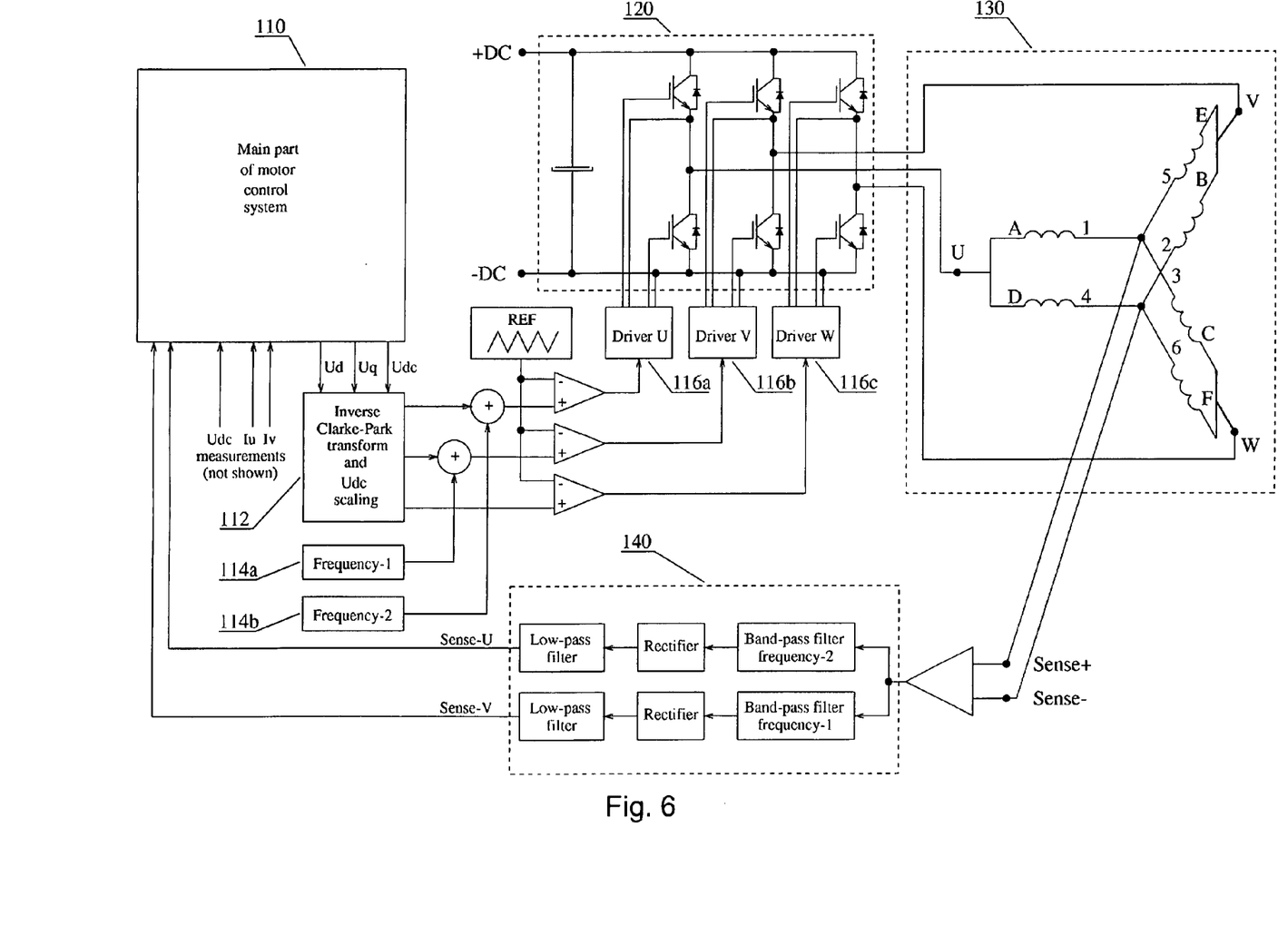
FIG. 6 shows a circuit diagram of a drive unit and windings.

Control signals Ud, Uq, and Udc are output from the drive unit and Clarke-Park transformed and scaled in a transformation unit 112. The transformed signals for the respective phase U, V, and W, together with a reference signal REF are output to phase driver units 116a–c driving a respective of phases U, V, and W. For excitation signal generators 114a and 114b having a respective frequency Frequency-1 and Frequency-2 are used to modulate the signals from the motor-control system to inject a signal into each of phase U and V, wherein Frequency-1 is different from Frequency-2. In this way, the signals Sense+ and Sense− will contain the result of these two signals, but in different frequency domains.

The driver units 116a–c are in turn connected to a three-phase bridge unit comprising power transistors etc. for driving a three-phase motor 130 with windings connected as in FIG. 4. Thus, the three phase terminals U, V, and W of the motor 130 are connected to a respective leg of the bridge unit 120.

The terminals Sense+ and Sense− are connected to a differential amplifier, the output of which is connected to a filter unit 140 comprising two parallel filter chains. Each filter chain comprises a band-pass filter tuned to a respective of the signal generators 114a, 114b letting through signals within a respective frequency band. With a drive unit switching frequency of 8 kHz, for example, the band-pass filters have pass band centered around 5 and 3 kHz, respectively. After rectification and low-pass filtering, the filtered signals Sense-U and Sense-V are input into the drive unit 110. Thus, these signals are used by the drive unit 110 to determine the speed and position of the motor 130.

The resulting amplitudes from different windings, such as winding A-1 and D-4, can thus be separated by means of the filter unit. The rectification and final low-pass filtering stage will give the separate signals "Sense-U" and "Sense-V".

For some motors, like 2-pole motors, it is not possible to have 2 Y-connected parts. In these cases a reference Y can be created by Y-connecting three suitable impedances and measuring between the center point of the reference Y being a virtual reference point and the center point of the single Y in the motor. This solution is provided if, in FIG. 6, the windings B-2, D-4 and F-6 are replaced by three resistors placed in or near the control unit.

It is also possible to have more than 2 Y-connected parts, which may simplify signal excitation and evaluation when operating in the time-multiplex domain.

Figure 7:
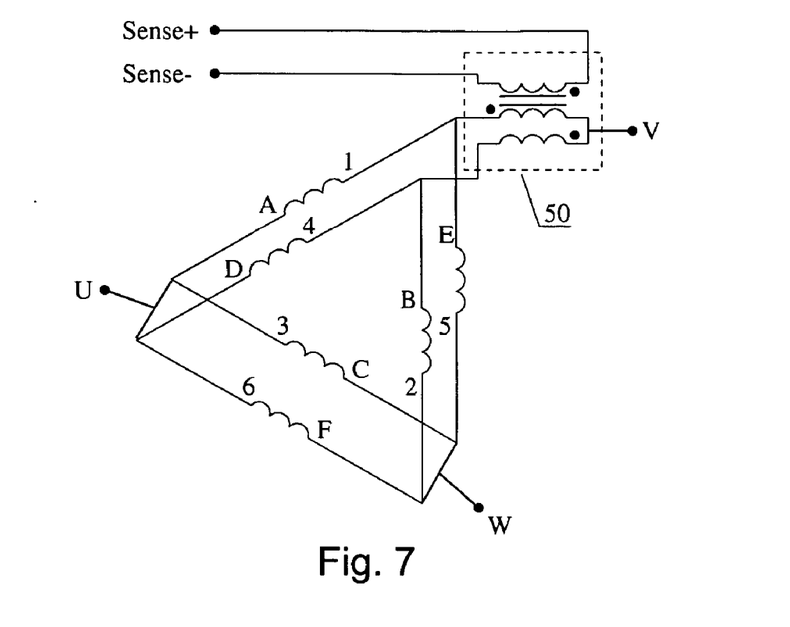
FIG. 7 shows D-connected windings with separate current sensing transformers.

In other cases a D-connected motor is preferred. FIG. 7 shows an example of this. In this embodiment a transformer 50 is used to extract the differential signal. Two signals can be extracted in this mode. If W and V are held at a constant potential and a signal is injected into U, we get the result of the difference from winding A-1 and D-4, and if U and V are kept constant and a signal is injected into W, the difference between E-5 and B-2 is obtained.

Figure 8:
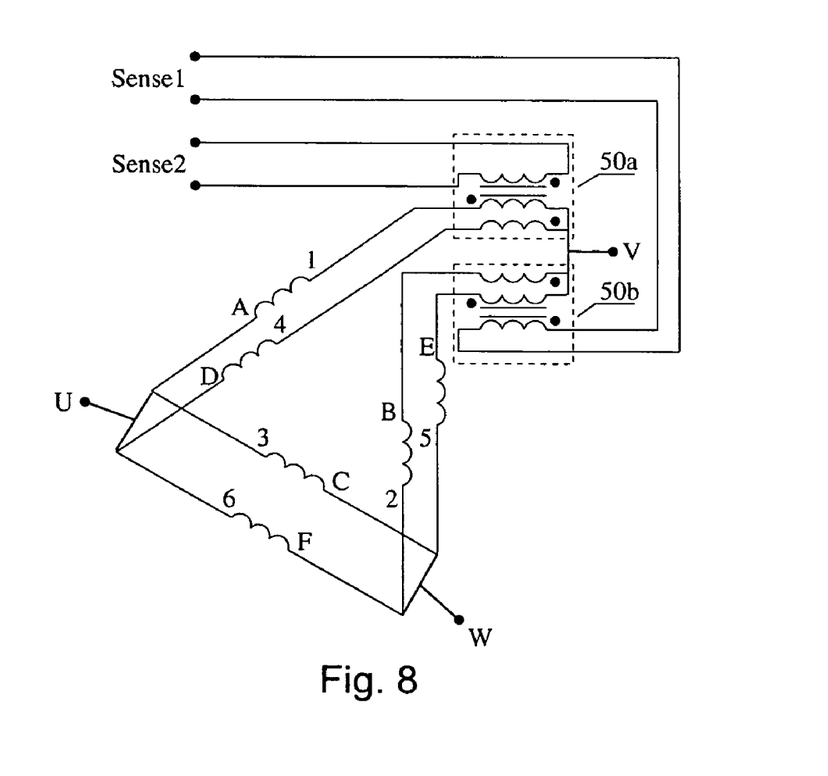
FIG. 8 shows another example of D-connected windings with separate current sensing transformers.

FIG. 8 shows another embodiment with two transformers 50a and 50b, where if the voltages U and W are held constant and a signal is injected into V, the results of both A-1, D-4 and E-5, B-2 are obtained separately.

Still in other cases, the separate transformers used in FIGS. 7 and 8 are not desired but galvanic insulation is, and there is space in the motor, the sense-windings can be provided in the stator slots 11 of motor itself.

For a motor with separate sense-windings some of the restrictions on $N_{difference}$ in the discussion above are not valid, since there is greater freedom to place the sense windings where they are wanted and there is not the restriction of measuring the entire main-winding-section inductance as above. The entire main-winding-section in this case refers to a section of the motor windings such as winding A-1 in FIG. 4. Thus the main-winding-sections can be made for constant (or near constant) inductance without detrimental effects on the sense-signals.

Figure 9:
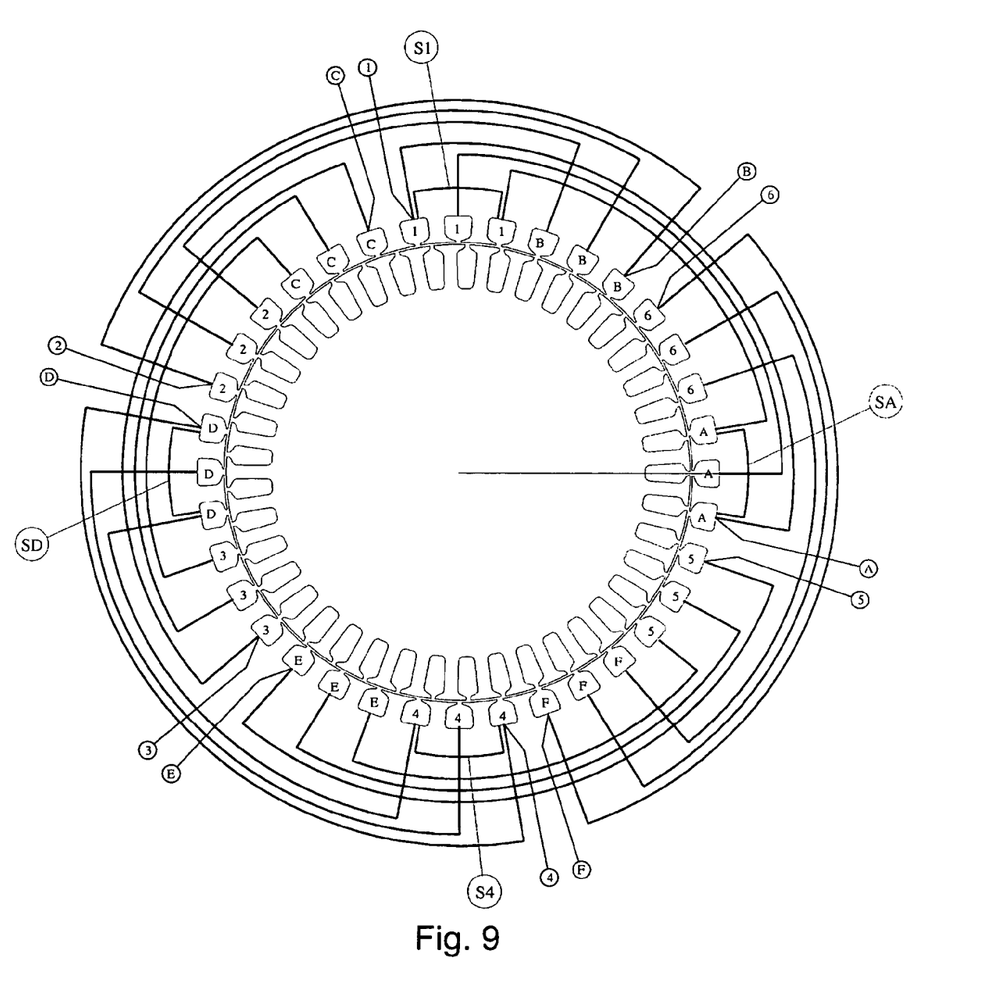
FIG. 9 shows an alternative embodiment of an induction motor according to the invention with integrated separate current sensing windings.

FIG. 9 shows the same motor as in FIG. 2, but with separate sense-windings as opposed to the previous embodiments, wherein the conventional stator windings have been used for sensing the rotor position. In this example the separate sense-windings are SA, S1, SD and S4. A closer look at SA reveals that it is wound in the lower slot A and the upper slot A, since the direction of the sense-wire relative to the main motor winding is opposite in the lower slot A versus the upper slot A, the resulting signal is the difference of $A_{upper}-A_{lower}$. The phase-difference between $A_{upper}$ and $A_{lower}$ should be big; a phase-difference close to 180° would be optimal. With $N_{difference}=5$ and $N_{stator}=36$, (that is 10° per stator slot) the phase difference between $A_{upper}$ and $A_{lower}$ is 2*5*10=100°, which is plenty. In this case a slightly larger value of $N_{difference}$ is preferred than in the method of inductance measurement of entire main-winding-sections as previously described.

For the control of speed and/or position the necessary information can be deduced from only SA and S1, but adding SD and S4 makes the control less sensitive to magnetic and mechanical imperfections in the motor.

Figure 10:
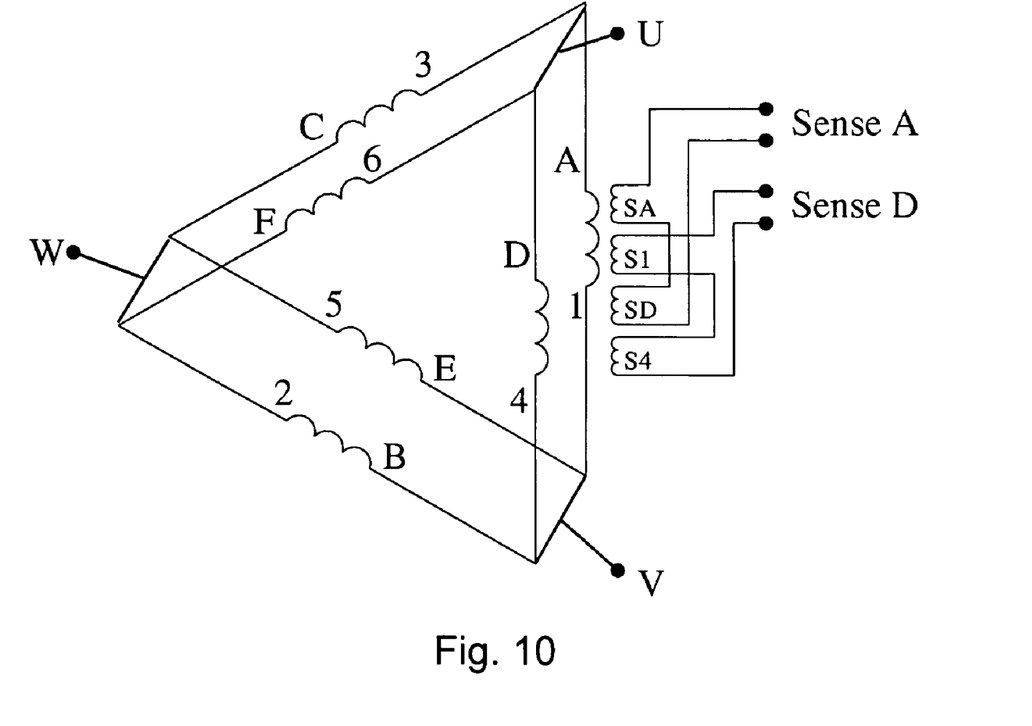
FIG. 10 shows D-connected windings with sense windings.

FIG. 10 shows another embodiment of a D-connected motor with sense windings according to the invention.

The excitation signal is to be injected between phase terminals U and V, and the resulting signals can be measured at Sense A and Sense D. These signals will in this example be 90° out of phase because of the geometry.

Since the described measuring does not depend on any contact points to the main-windings, the motor may be connected according any of the schemes shown in FIGS. 3a, 3b, 3c and 3d, with only small differences in how the excitation is made.

The invention can generally be applied to applications where the induction motor has to be accurately speed and/or position controlled. Among others, the invention can be applied to:
1) Electrically driven lift trucks which usually have one or two electric motors for providing traction power to the truck and an electric motor for a pump which supplies the hydraulic circuits.
2) Electrical vehicles like cars, scooters and wheel chairs for providing traction power.
3) Industrial application like packaging machines.

Preferred embodiments of an induction motor with integrated sensor according to the invention have been described. A person skilled in the art realizes that these could be varied within the scope of the appended claims.

Embodiments with specific numbers of pole and slot numbers have been described. It will be appreciated that it is easy to extend the invention to induction motors having other pole and slot numbers.

A number of simplifications have been made when describing the inventive idea. It will be appreciated that in practice computations will be more complex than in this description, taking into considerations factors such as the skewing of the rotor slots. Skewing the rotor is effective for reducing torque ripple and cogging torque. The simple calculations described herein apply for a lamination and a stack of laminations without any skew, i.e., the stator windings face the same rotor slots all along the winding. However, with partially skewed rotor slots, such as with half skewed rotor slots, the impact of the skewing must be taken into consideration in the calculations. As already mentioned, fully skewed rotor slots would lead to the stator windings having the same inductance irrespectively of the rotor position which would make the inventive sensing impossible. By "fully skewed" is understood that the rotor and/or stator stacks are twisted so that if at the bottom of the stacks a rotor slot is aligned with a first stator slot then on the top of the stacks, the same rotor slot is aligned to a second stator slot being adjacent to the first stator slot.

Some examples describing the arrival at a preferred difference in number of stator and rotor slots have been given. It will be appreciated that each combination of stator slots and/or windings results in a unique determination of this difference in number of slots. These determinations can be made either by theoretical calculations or by trial and error.

It is preferred that the rotor slots include aluminum due to its blocking effect on magnetic flux at high frequencies. It will be appreciated that other materials exhibiting similar properties can be used as well.

Differential measuring has been described as the preferred method of obtaining the sense signals. Using two center taps is a convenient solution for getting relatively accurate signals. However, it will be appreciated that the use of only one phase winding will fall within the scope of the present invention.

The windings used for sensing have been described as extending all along the stator. It will be appreciated that they can extend only partly along the length of the stator. In this case, the inventive idea is applicable also for motors having fully skewed rotors.

I claim:

1. An induction motor, comprising a stator having a number of stator slots, wherein at least some of the stator slots include at least one stator winding,
   a rotor having a number of rotor slots, which include material essentially blocking magnetic flux at high frequencies,
   wherein a difference in number of stator slots and rotor slots are chosen so that the inductance of a winding provided in a stator slot is different from the inductance of a winding provided in another stator slot for a given rotor position;
   wherein a sense means is provided in at least one of the stator slots and the sense means is arranged to allow measuring of the inductance of the sense means, wherein at least one of the rotor position or speed is determined by using the measured inductance value.

2. The motor according to claim 1, wherein at least one of the stator or rotor slots are evenly distributed.

3. The motor according to claim 1, wherein the sense means comprises at least two phase windings.

4. The motor according to claim 1, comprising differential sense terminals connected to the at least two phase windings.

5. The motor according to claim 1, wherein the sense means comprises separate sense windings provided in stator slots.

6. The motor according to claim 1, wherein the difference in number of the stator slot and the rotor slots in an odd number.

7. The motor according to claim 1, wherein the stator windings are Y-connected.

8. The motor according to claim 1, wherein the stator windings are D-connected.

9. The motor according to claim 1, comprising a transformer arranged to extract an information signal from the sense means.

10. The motor according to claim 1, wherein the rotor is not fully skewed.

* * * * *